Dec. 11, 1951     J. H. HARTMAN     2,578,629
VALVE PROTECTOR
Filed May 31, 1949
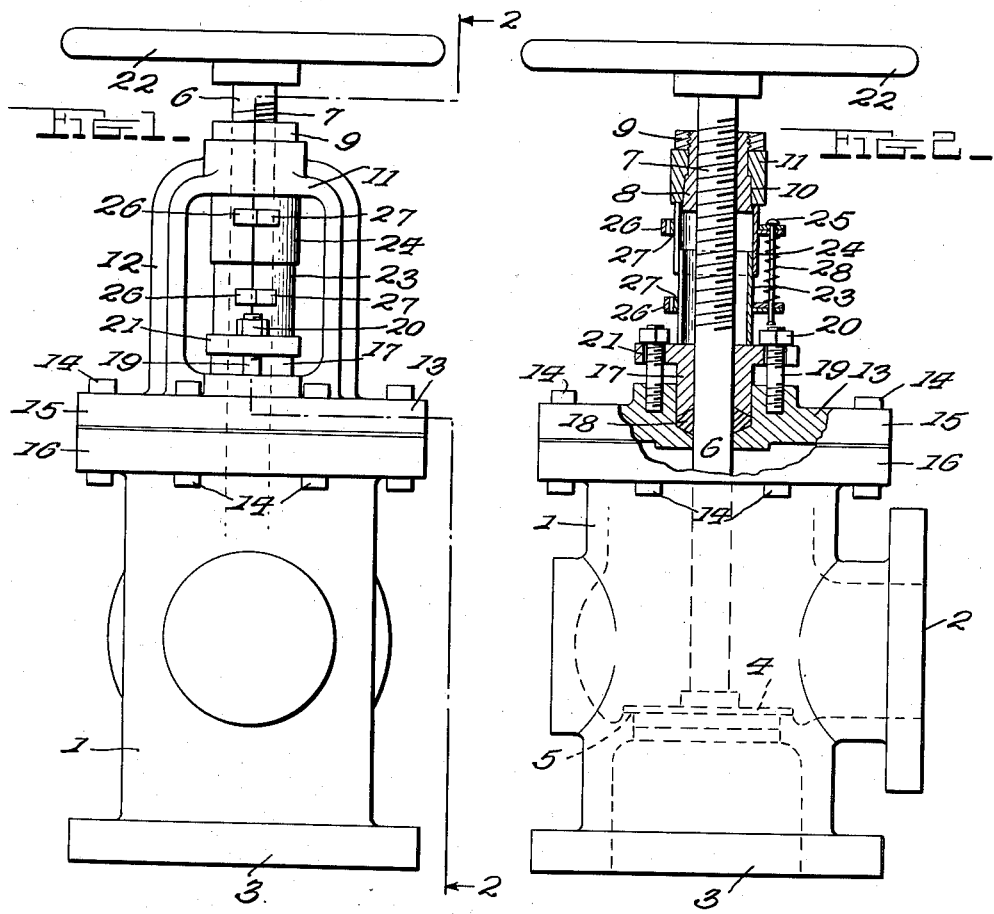
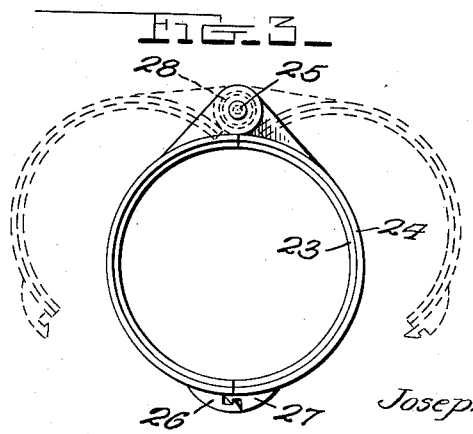
Inventor
Joseph H. Hartman
By Bryant & Lowry
attys.

Patented Dec. 11, 1951

2,578,629

UNITED STATES PATENT OFFICE 2,578,629

VALVE PROTECTOR

Joseph H. Hartman, Norristown, Pa.

Application May 31, 1949, Serial No. 96,312

6 Claims. (Cl. 137—111)

The present invention relates to valve protectors for valves having exposed threaded shanks which may be subject to corrosion and rapid wear by collection of external dirt and grime or chemicals.

Many valves of various types are used in unfavorably dirty or grimy locations, where their exposed working parts, particularly the threaded portions of their shanks, are continually subject to rapid wear and corrosion, due to the parts being covered by the dirt and grime which is rubbed into the working surfaces between the parts. The resulting wear requires frequent repairs and replacement of parts with the attendant shutdowns, which may be very expensive in some cases.

In the handling of chemical fluids, where the external parts of the valves are exposed to leaks or spills of the chemical fluids, corrosion of the working parts of the valves is likewise troublesome.

The object of this invention, accordingly, is to provide valve protector means for shielding the normally exposed portion of the shank of a valve of the type which has a yoke extending from the valve casing to support a nut near the outer end of the valve shank for cooperation with the thread on the valve shank for moving the valve in or out in accordance with the turning of the valve shank by means of a handle at its outer end.

A further object is to provide protecting means for the portion of the valve shank in the above type of valve which extends between the valve casing and the nut supported by the yoke.

A further object is to make a split axially hinged sleeve to fit around this portion of the valve shank.

A still further object is to construct the above mentioned sleeve of two telescoping parts resiliently urged outwardly of each other, so as to take up any axial movement of the packing gland in the valve casing around the inner end of the valve shank, and continue to fully enclose the exposed portion of the valve shank even if the packing gland is adjusted inwardly of the casing to tighten the packing.

Other and more specific objects will appear in the following detailed description of one form of the protector means constructed in accordance with this invention, having reference to the accompanying drawing, wherein:

Figure 1 is an elevational view of a valve equipped with a preferred form of the protector means for the valve shank, Figure 2 is a side view thereof, partly in section, taken as indicated by the line 2—2 of Figure 1, and Figure 3 is an end view of the protector means, showing in dotted lines the position of the parts in open condition prior to installation on or after removal from a valve.

For the purpose of illustrating the present invention and its application, a valve casing 1 having and an inlet 2 an outlet 3 is shown in Figures 1 and 2. A valve head 4 is shown in dotted lines in Figure 2, seated on the valve seat 5, and having a valve shank 6 which has a threaded portion 7 operating in a nut 8.

The nut 8 is fixed by means of a lock nut 9 in an opening 10 in the top or outer end 11 of a yoke 12, which is integrally formed on the top of a cover plate 13 for the valve casing. The cover plate is fixed to the casing by bolts 14 passed through their flanges 15 and 16 respectively.

Where the valve shank passes through the cover plate, the latter is provided with a packing gland 17 adjustable to compress the packing 18 around the valve shank by means of studs 19 in the cover plate and nuts 20 over the flange 21 of the packing gland cooperating with the studs.

The outer end of the valve shank may be provided with a hand wheel 22 or any other gripping means whereby the valve shank may be manually turned to close or open the valve.

The device of this invention as applied to the above type of valve consists of a pair of telescoping sleeves 23 and 24, which are each split and hinged axially opposite their split sides on a common hinge pin 25. The sleeves may thus be opened up so that they may be placed around the valve shank, between the outer face of the packing gland 17 and the inner face of the outer end 11 of the yoke around the nut 8, and then closed. The adjacent edges of each split sleeve are provided with spring clips shown in the form of hooked lugs 26 and 27 that automatically catch when the sleeve is closed and keep the edges tightly together until released by manual axial displacement when it is desired to open the sleeve. A spring 28 is mounted around the hinge pin between the hinges to provide an axially outward bias between the two sleeves in order to maintain their outer ends in close contact with the packing gland and the yoke respectively so as to completely close the valve shank portion within the yoke and protect it against attack by dirt, grime, chemicals, etc., which might otherwise cause rapid wear of the valve shank. This close contact is maintained even if the gland is axially displaced during its adjustment.

The sleeves 23 and 24 may be made of light acid resistant material such as Pyrex or they may be made of aluminum, steel, tin or any other suitable material as may be desired.

Many obvious modifications in the construction of the present device may be made in accordance with the requirements with respect to different applications without departing from the spirit and scope of this invention, as defined in the appended claims.

What is claimed is:

1. A valve shank protector for a valve having an exposed portion of its shank, comprising a pair of split, axially hinged sleeves telescoped and adaptable to be placed around the exposed portion of the valve shank, a common hinge pin slidably fitting in said axial hinges whereby to keep the sleeves in telescoping relation while permitting axial movement, and biasing means guided on said hinge pin between said hinges for urging said telescoped sleeves axially outwardly of each other to maintain close contact with the valve structure adjacent the ends of the exposed portion of the valve shank and completely close the said portion against attack by dirt, grime, chemicals or any other harmful agents that might be present.

2. A valve shank protector as defined in claim 1, wherein said split edges of each sleeve are provided with spring catches for automatically locking the sleeves in closed position when placed around said valve shank portion.

3. A valve shank protector as defined in claim 2, wherein said biasing means comprises a coil spring mounted on said hinge pin between said hinges.

4. A valve shank protector as defined in claim 3, wherein said sleeves are made of light acid resistant material.

5. A protector of the class described comprising a sleeve longitudinally split into two halves, said halves having abutting external hinge knuckles at one longitudinal edge; a second sleeve telescoped slidably with the aforesaid sleeve, said second sleeve being longitudinally split into two halves, these halves having abutting external hinge knuckles at one longitudinal edge; a single hinge pin extending longitudinally of said sleeves and extending through the abutting hinge knuckles of both of said sleeves, a coiled compression spring surrounding said hinge pin, and at its ends abutting one of the knuckles of each sleeve, the knuckles of at least one of said sleeves being slidable longitudinally upon said hinge pin, and releasable means for holding the two halves of each sleeve in relatively closed position.

6. A structure as specified in claim 5; said releasable means consisting of hooked lugs on said halves of each of said sleeves and self-engageable with each other upon closing of said halves.

JOSEPH H. HARTMAN.

REFERENCES CITED

The following references are of record in the file of this patent:

UNITED STATES PATENTS

| Number | Name | Date |
| --- | --- | --- |
| 910,453 | Black | Jan. 19, 1909 |
| 1,182,939 | Snow | May 16, 1916 |
| 1,218,187 | Khumber | Mar. 6, 1917 |